United States Patent [19]
McCarroll

[11] 3,724,906
[45] Apr. 3, 1973

[54] WHEEL COVER

[76] Inventor: Raymond A. McCarroll, 1725 Newcastle, Grosse Pointe Woods, Mich. 48236

[22] Filed: Jan. 25, 1972

[21] Appl. No.: 220,630

[52] U.S. Cl.............................301/37 R, 292/56.67
[51] Int. Cl. ...............................................B60b 7/06
[58] Field of Search......301/37 R, 37 P, 37 S, 108 R; 292/256.65, 256.67; 70/168, 169

[56] References Cited

UNITED STATES PATENTS

| 2,073,851 | 3/1937 | Powell | 301/108 R |
| 3,512,840 | 5/1970 | Foster | 292/292.67 X |
| 3,532,385 | 10/1970 | Foster | 229/256.65 |
| 3,663,064 | 5/1972 | McCarroll | 301/37 P |
| 3,663,065 | 5/1972 | Grompton | 301/37 R |

Primary Examiner—Richard J. Johnson
Attorney—Olsen & Stephenson

[57] ABSTRACT

A vehicle wheel cover disposed over the side of a wheel having a drop center type rim, said cover including a disk portion with an axially inwardly extending annular flange that is telescoped into an axial flange of the drop center rim. The annular flange has mounted thereon a radially expansible and contractible annulus which when expanded will center and lock the cover in place on the wheel. The disk and annular flange portions of the cover are formed by molding of plastic or non-ferrous materials or by die casting of non-ferrous metals such as aluminum and zinc alloys, or ferrous alloys by suitable forming operations.

13 Claims, 6 Drawing Figures

PATENTED APR 3 1973

WHEEL COVER

CROSS REFERENCE TO RELATED APPLICATION

This application relates to a wheel cover assembly of the type disclosed in pending application Ser. No. 6,263, filed Jan. 27, 1970, now U.S. Pat. No. 3,663,064, in the name of Raymond A. McCarroll.

BACKGROUND OF THE INVENTION

The present invention relates to improvements in wheel covers and wheel trims, and particularly to means for mounting the same on a vehicle wheel.

Conventional wheel covers that have been used in the past on motor vehicles normally have been formed from sheet metal and employ spring fingers for bitingly gripping a flange of a drop center rim center. Covers of this type are disclosed, for example, in U.S. Pat. No. 2,624,634. Improvements have been made in such wheel covers, as is disclosed in the aforesaid copending application Ser. No. 6,263, wherein the disk portion of the cover is formed by molding or die casting the disk and then mounting a wheel retention assembly on the disk for holding the cover on a wheel member.

There has been an increasing demand recently for maximum safety in all accessories or components of motor vehicles. One of the problems that has existed with the conventional wheel covers used heretofore has been the tendency of the cover to disengage itself from the wheel member when subjected to certain unfavorable driving conditions. This may occur when driving at high speeds when a bump or the like is encountered, or it will readily occur if the tire of the vehicle should become soft or flat while the vehicle is in motion. The conventional wheel covers can be made to grip the rim very firmly to minimize problems of this character, but they then create problems relative to removing and remounting them. Thus, there remains a need in the prior art for improvements in wheel covers which not only will enhance their appearance but also which will improve the gripping action of the wheel cover assembly when subjected to the most severe driving conditions. There is further need to provide wheel covers having these characteristics which retain properties enabling them to be readily removed from the wheel member and restored in place with minimum effort and inconvenience for the individual who may be removing or remounting the cover assembly.

SUMMARY OF THE INVENTION

The present invention is directed to wheel covers which are characterized by their higher and safer retention capabilities when mounted on wheel members, and which can be removed and remounted with relative ease.

It is among the objects of the present invention to provide an improved wheel cover assembly which is constructed and arranged to provide improved, safer wheel gripping properties, which can be manufactured in a more economical manner, which has improved ornamental design features, and which is characterized by the ease with which it can be mounted and dismounted from a wheel member.

According to a preferred form of the present invention, a wheel cover assembly is provided for mounting on the side of a wheel member. The cover member has an axially inwardly directed portion telescoped into an axial flange of the wheel member. A radially expansible and contractible annulus is mounted on the axially inwardly directed portion of the wheel member releasably securing the cover member on the wheel member. The annulus includes a band of fixed length movable circumferentially between first and second positions and a plurality of U-shaped spring clips or fingers that are located at spaced circumferential intervals relative to the band and which are retained by the cover member against circumferential movement. The spring clips are arranged in horizontal positions with the legs extending axially inward and with one leg located radially outward of the other leg. The other leg is secured to the wheel member and the one leg has teeth in gripping engagement with the axial flange of the wheel member when the one leg is urged away from the other leg. This function is performed by the band which has a plurality of cam surfaces corresponding in numbers and spacing to the plurality of spring clips. The band passes between the legs of the clips, and the cam surfaces are inclined so that when the band is moved to its first position the cam surfaces will move the spring clips radially outward into gripping engagement with the wheel member, and when the band is moved to its second position the spring clips will be returned to their radially inward positions releasing the wheel member. Means are provided on the wheel member for moving the band between its first and second positions.

To minimize frictional resistance to the movement of the band from its first position to its second position the cam surface as well as the upper leg of the spring clip is constructed and arranged to provide only a relatively short line contact between the relatively movable part. Also, the teeth of the one leg of the clip are arranged to provide maximum gripping action and also to prevent relative rotation of the cover member with respect to the wheel member.

Other objects of this invention will appear in the following description and appended claims, reference being had to the accompanying drawings forming a part of this specification wherein like reference characters designate corresponding parts in the several views.

Figure 1:
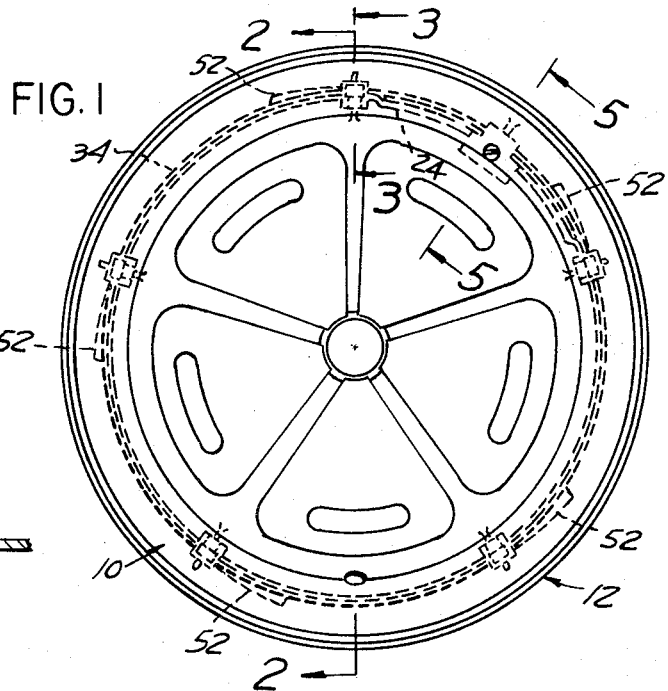
FIG. 1 is a side elevational view of a wheel cover embodying the present invention mounted on a vehicle wheel.
Figure 2:
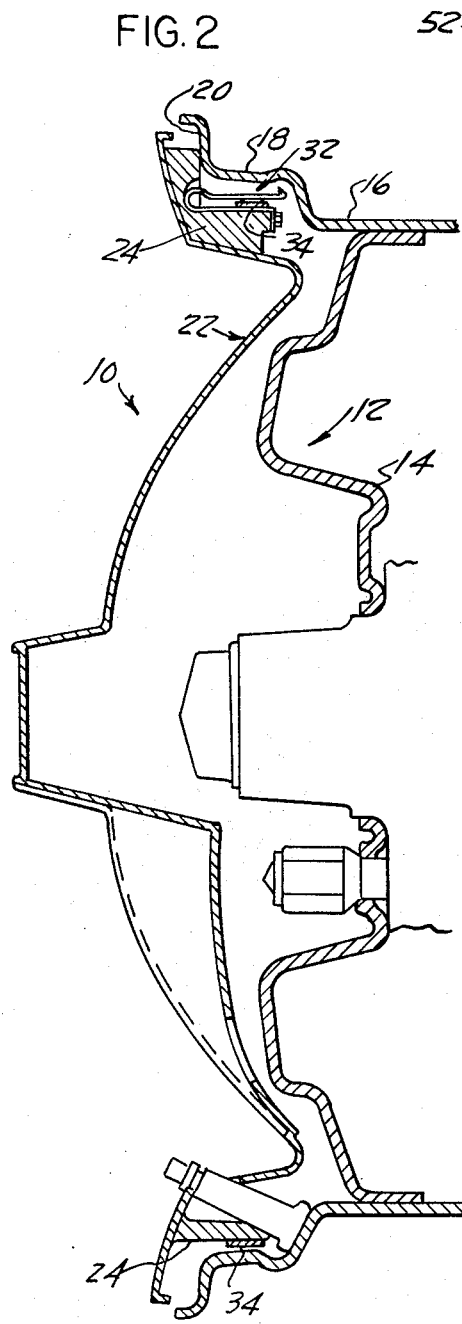
FIG. 2 is an enlarged fragmentary section taken on the line 2—2 of FIG. 1.

DESCRIPTION OF THE PREFERRED EMBODIMENT.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The wheel cover or cover assembly 10 is constructed and arranged to be applied to the outer side of the vehicle wheel member 12 which includes the wheel body 14 and the drop center type tire rim 16. The tire rim 16 is a conventional construction that includes an intermediate axial flange and a side or radial flange 20 which extends radially outward from the axial flange 18.

The cover assembly 10 includes a cover member 22 which has an ornamental outer side or disk that conceals the wheel body 14 and portions of the tire rim 16, and it has an axially inwardly directed portion 24 adjacent to its outer periphery. The axially inwardly directed portion 24 is telescoped in radially spaced relation into the outwardly extending annular flange 18 of the wheel member 12.

Wheel member 22 includes a plurality of bosses 26 spaced around its outer periphery which are seated against the side flange 20 to limit the extent to which the axially inwardly extending portion 24 can be telescoped into the outwardly extending annular flange 18. The bosses 26 define semi-circular pockets 28 for retaining against circumferential movement one end of each of the spring clips or fingers 30, which are part of the radially expansible and contractible annulus 32 that is mounted on the axially inwardly directed portion 24.

The annulus 32 includes a band 34 that in the disclosed embodiment is made from steel and has its ends 36 and 38 secured together by the clips 40. Thus, the band 34 is circular in configuration and has a fixed circumference.

Figure 3:
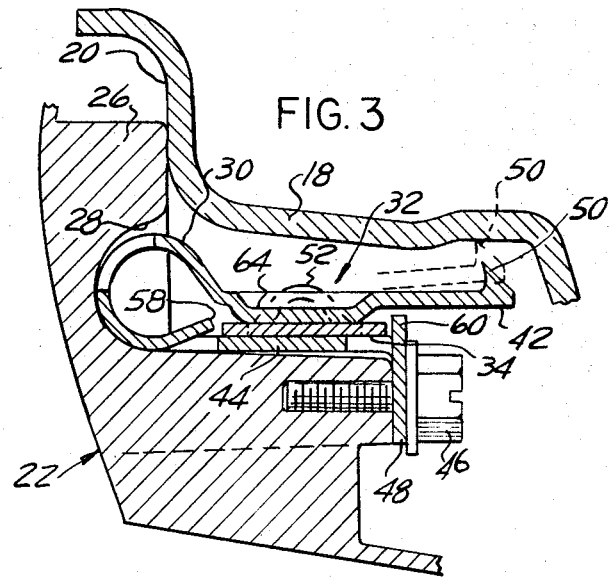
FIG. 3 is an enlarged fragmentary sectional view taken on the line 3—3 of FIG. 1 showing in solid lines one of the spring retaining clips in its unlocked position and showing in broken lines the clip retainingly engaging the rim of the wheel member.
Figure 4:
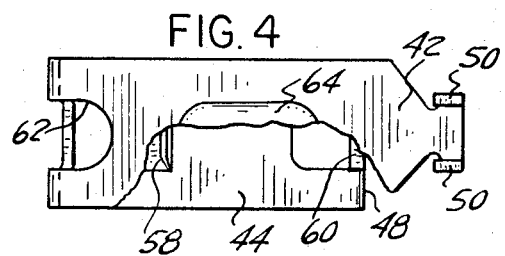
FIG. 4 is a top plan view, with a portion broken away for illustration purposes, of the spring clip illustrated in FIG. 3.
Figure 5:
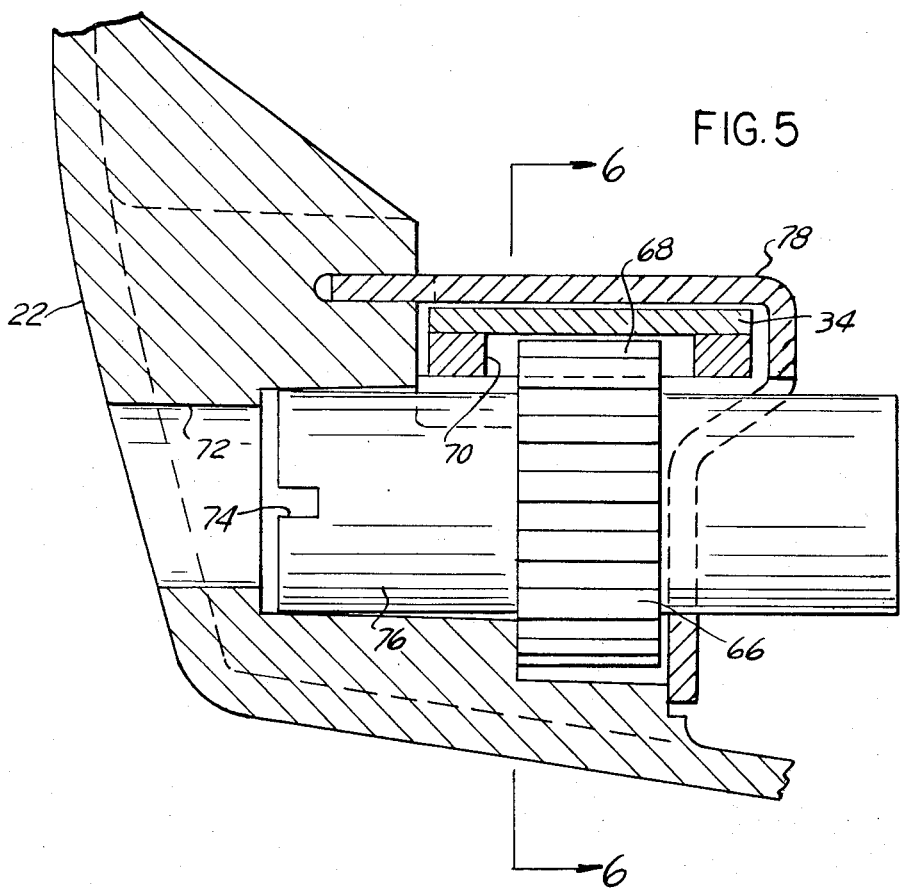
FIG. 5 is an enlarged fragmentary view taken on the line 5-5 of FIG. 1.
Figure 6:
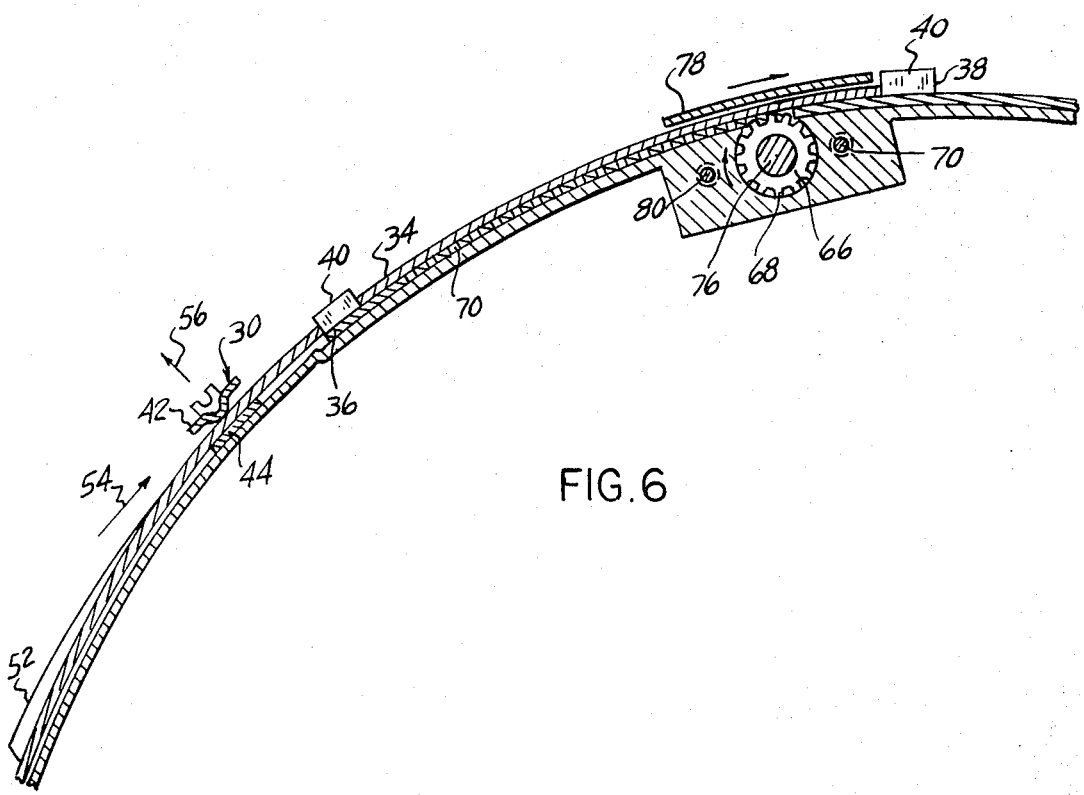
FIG. 6 is a fragmentary section taken on the line 6-6 of FIG. 5.

The radially expansible and contractible annulus also includes the plurality of spring fingers or clips 30 located at circumferentially spaced intervals relative to the band and retained by the cover member 22 in the semi-circular pockets 28. The spring clips 30 are arranged in horizontal positions so that the legs 42 and 44 extend axially inward with the one leg 42 located radially outward of the other leg 44. The other leg 44 is secured to the wheel member by means of the screw 46 which passes through the tab 48 which is formed out of the material of the distal end of the other leg 44. As seen best in FIG. 3, the one leg 42 has teeth 50 at its distal end which, when the leg is deflected radially outwardly to the illustrated broken line position, will be in gripping engagement with the axial flange 18. For the purpose of deflecting the one leg 18 to its radially outer position, the band 34 passes between the legs 42 and 44, and the band has a plurality of cam surfaces 52 corresponding in numbers and spacing to the plurality of spring clips 30. As can be seen in FIG. 6, the cam surfaces 52 are inclined so that when the band is moved from the position shown in FIG. 6 in the direction of the arrow 54 to a first position between the legs 42 and 44, the one leg 42 will be moved radially outward in the direction of the arrow 56 until the teeth 50 grip the rim flange 18. When the band 34 is returned to its original position shown in FIG. 6, the resilient properties of the spring clip 30 will restore the one leg 42 to the position shown in solid lines in FIG. 3 so that the cover can readily be removed from the wheel member.

For the purpose of maintaining the band 34 in proper axial position, each of the spring clips 30 has tangs 58 and 60 struck out of the material of the leg 44. It will be observed that the tangs 60 can be formed in the same operation in which the tab 48 is formed, and the tang 60 is then an extension of the tab 48. By virtue of the location of the tangs 58 and 60, the band 34 will be retained against axial displacement, as can be seen best in FIG. 3. To control the amount of flexing that occurs in the closed end of the U-shaped clip 30, a slot 62 may be formed or cut therein, as shown.

To minimize the frictional resistance that will occur when the band 34 is moved between its first or one position wherein the teeth 50 will grip the flange 18 and its second or other position wherein the teeth are released from the flange 18, it is preferred that the one leg 42 have a bubble or bead 64 formed therein which extends lengthwise of the leg 42 to control the extent of flexing that occurs and also provides a line contact with the band 34. Similarly, the cam surface 52 is arcuate-shaped in a transverse direction so that it has essentially a line contact for engagement with the bead or bubble 64, thus enabling the leg 42 to be actuated with a minimum of frictional resistance to movement of the band 34. A cam angle below 7° is used to insure a self-locking action.

For the purpose of moving the band 34 between its first and second positions, the cover member 22 journaled in it for rotation of a pinion gear 66 which has its teeth 68 in mesh with the perforations 70 in the band 34. A hole is provided in the front surface of the cover member 22 to permit insertion of a tool, such as a screwdriver, into the slot 74 of the shaft 76 on which the pinion gear 66 is mounted. Thus, it can readily be seen that if it is desired to move the band 34 between its first and second positions, this can be accomplished merely by turning the shaft 76 in one direction or the other with the screwdriver. The pinion gear 66 and its shaft 76 can easily be mounted in place on the cover member 22 by means of the bracket 78 and the screws 80.

From the foregoing description it can be understood that a simple and effective centering and retention means has been provided for a wheel cover assembly wherein the cover member 22 can be formed entirely by a die casting operation or by an injection molding operation or by suitable steel forming operations, and an improved radially expansible and contractible annulus 32 is provided for locking the cover or releasing the cover in a very simple but effective manner. Not only does the annulus 32 function in this manner, but it is a very effective way of retaining the cover so that it cannot be easily dislodged. Furthermore, because of the location of the biting teeth on opposite edges of the one leg 42, the cover member 22 will not tend to rotate relative to the wheel member 14.

It is claimed:

1. A cover assembly for mounting on the side of a wheel member comprising a cover member with an axially inwardly directed portion located adjacent to its outer periphery, a radially expansible annulus mounted on said axially inwardly directed portion for retaining said cover member on a wheel member, said annulus including a band of fixed length movable circumferentially between first and second positions and a plurality of spring fingers located at spaced circumferential intervals relative to said band and retained by said cover member against circumferential movement, said spring fingers being movable radially outward and inward for gripping and releasing a wheel member, said band having a plurality of cam surfaces corresponding in numbers and spacing to said plurality of spring fingers and inclined so that when said band is moved to its first position the cam surfaces will move said spring fingers radially outward and when said band is moved to its second position the spring fingers can return to their radially inward positions, and means for moving said band between its first and second positions.

2. The cover assembly that is defined in claim 1, wherein said spring fingers are generally U-shaped and are arranged in horizontal positions with the legs extending axially inward and with one leg located radially outward of the other leg, said other leg being secured to said wheel member, and said band passes between said legs so that each cam surface can engage its associated one leg and urge it outward when the band is moved to its first position.

3. The cover assembly that is defined in claim 2, wherein said other leg has tangs struck out of the material thereof and projecting in a radially outward direction on opposite sides of said band to limit axial shifting of said band.

4. The cover assembly that is defined in claim 2, wherein said one leg has teeth projecting radially outward at its distal end for engagement with said wheel member.

5. The cover assembly that is defined in claim 2, wherein said one leg has a bead formed therein extending lengthwise of the leg on which said cam surface can travel.

6. The cover assembly that is defined in claim 2, wherein said other leg has a radially inwardly directed tab at its distal end, said other leg being secured to said wheel member by securing said tab to the wheel member.

7. The cover member that is defined in claim 6, wherein one of said tangs is a radially outwardly directed extension of said tab.

8. The cover member that is defined in claim 2, wherein said wheel member has semi-circular pockets in which the closed ends of said U-shaped fingers are positioned.

9. The cover member that is defined in claim 1, wherein said means comprises a gear rotatably mounted in said cover member, and said band has perforations in mesh with the teeth of said gear.

10. In combination, a wheel member having an axial flange, a cover assembly mounted on the side of said wheel member comprising a cover member having an axially inwardly directed portion telescoped into said axial flange, and a radially expansible and contractible annulus mounted on said axially inwardly directed portion releasably securing said cover member on said wheel member, said annulus including a band of fixed length movable circumferentially between first and second positions and a plurality of U-shaped spring clips located at spaced circumferential intervals relative to said band and retained by said cover member against circumferential movement, said spring clips being arranged in horizontal positions with the legs extending axially inward and with one leg located radially outward of the other leg, said other leg being secured to the wheel member and said one leg having teeth in gripping engagement with said axial flange when the one leg is urged away from said other leg, said band having a plurality of cam surfaces corresponding in numbers and spacing to said plurality of spring clips and passing between said legs, said cam surfaces being inclined so that when said band is moved to its first position the cam surfaces will move said spring clips radially outward into gripping engagement with said wheel member and when said band is moved to its second position the spring clips will return to their radially inward positions releasing said wheel member, and means for moving said band between its first and second positions.

11. The combination that is defined in claim 10, wherein the upper leg of each spring clip has a longitudinally extending radially inwardly directed bead that provides generally a line contact with its associated cam surface.

12. The combination that is defined in claim 11, wherein said cam surfaces are formed out of the material of said band and have a transverse arcuate configuration that increases in depth progressively in a circumferential dimension.

13. The combination that is defined in claim 10, wherein said one leg of each clip has a tooth at each edge arranged to oppose relative rotation of the cover member with respect to the wheel member.

* * * * *